United States Patent [19]

Stanley

[11] Patent Number: 5,005,613

[45] Date of Patent: Apr. 9, 1991

[54] LIGHT WEIGHT FLEXIBLE COAXIAL VAPOR RECOVERY HOSE

[75] Inventor: John H. Stanley, Uniontown, Ohio

[73] Assignee: The GoodYear Tire & Rubber Company, Akron, Ohio

[21] Appl. No.: 536,052

[22] Filed: Jun. 8, 1990

Related U.S. Application Data

[63] Continuation of Ser. No. 498,153, Mar. 23, 1990, abandoned, which is a continuation of Ser. No. 272,611, Nov. 17, 1988, which is a continuation of Ser. No. 911,852, Sep. 26, 1986, abandoned.

[51] Int. Cl.$^5$ .................. B65B 3/18; F16L 47/00; F16L 9/18
[52] U.S. Cl. .................. 141/45; 141/59; 141/392; 138/109; 138/113; 138/121; 138/122; 138/114; 138/148; 285/133.1
[58] Field of Search ............... 138/109, 112, 121, 122, 138/118, 111, 112, 113, 114, 115, 148; 285/134, 138, 903, 133.1, 392; 141/285, 290, 44, 45, 392, 59; 128/911; 134/99, 102

[56] References Cited

U.S. PATENT DOCUMENTS

| | | | |
|---|---|---|---|
| 2,325,616 | 8/1943 | Landweber | 138/113 |
| 3,426,803 | 2/1969 | Kikukawa | 138/114 |
| 3,841,671 | 10/1974 | Walker | 285/133.1 |
| 3,980,112 | 9/1976 | Bosham | 285/133.1 |
| 3,986,732 | 10/1976 | Stanley | 285/134 |
| 4,037,626 | 7/1977 | Roberts | 138/148 |
| 4,149,568 | 4/1979 | Kuntz et al. | 138/114 |
| 4,250,927 | 2/1981 | Newburg | 138/113 |
| 4,260,183 | 4/1981 | Krupp | 285/134 |
| 4,274,549 | 6/1981 | Germain | 285/133.1 |
| 4,718,568 | 1/1988 | Polu | 138/113 |
| 4,828,123 | 5/1989 | Fink | 141/59 |
| 4,951,720 | 8/1990 | Grantham | 141/59 |

Primary Examiner—James E. Bryant, III
Attorney, Agent, or Firm—Marc R. Dion, Sr.

[57] ABSTRACT

A coaxial vapor recovery hose assembly comprising an inner hose, an outer hose, and structure for holding said hoses in concentric relationship; wherein the inner hose is substantially reinforced to be relatively incompressible as well as being capable of bearing tensile stress applied to the assembly and having an outside diameter; wherein the outer hose is corrugated and has an inside diameter larger than the outside diameter to define a vapor passageway therebetween.

5 Claims, 2 Drawing Sheets

LIGHT WEIGHT FLEXIBLE COAXIAL VAPOR RECOVERY HOSE

This is a continuation of application Ser. No. 07/498,153 filed 3-23-90 now abandoned which is a continuation of application Ser. No. 07/272,611, filed Nov. 17, 1988, which is a continuation of application Ser. No. 06/911,852, filed Sept. 26, 1986, now abandoned.

FIELD OF THE INVENTION

This invention relates to a volatile liquid and vapor transfer hose assembly. More particularly it relates to a coaxial vapor recovery hose assembly.

BACKGROUND OF THE INVENTION

The commercial use of coaxial vapor recovery hoses for the transfer of volatile fluids has been in existence for approximately a decade. These systems generally include a pair of hoses, one carrying fuel from a supply tank to a receiving tank, the other carrying fuel vapor from the receiving tank back to the supply tank. These systems generally provide for a relatively closed system to avoid the discharge of volatile vapors into the atmosphere.

Some prior art coaxial vapor recovery hose assemblies generally taught the use of a smaller diameter internal hose or conduit capable of withstanding surge pressures of 30 to 40 psig to deliver the volatile liquid such as gasoline from the supply tank to the receiving tank. The outer hose was taught to require a working pressure on the order of 120 psig. This capability of the outer hose was because of the construction which was required to withstand the severe abuse normally encountered in a gasoline service station as well as to protect the internal hose. These prior art outer hoses were also constructed so as to function as the tensile bearing member of the assembly. As a result of such constructions, the assemblies which have found their way into commerce, while being somewhat flexible are still relatively rigid necessitating the use of additional fittings such as swivel couplings between the nozzle assembly and the hose assemblies. In addition, the construction of the outer hose adds considerably to the weight of the assembly.

SUMMARY OF THE INVENTION

In accordance with the practice of the present invention, there is disclosed a coaxial vapor recovery hose assembly comprising:
(a) an inner hose,
(b) an outer hose, and
(c) means for holding said hoses in concentric relationship:
wherein said inner hose is substantially reinforced to be relatively incompressible as well as being capable of bearing tensile stress applied to the assembly and having an outside diameter wherein said outer hose is corrugated and has an inside diameter larger than said outside diameter to define a vapor passageway therebetween.

The use of a substantially reinforced inner hose not only provides the advantage of being crush and kink resistant but allows the inner conduit or hose to be the tensile bearing member of the coaxial vapor recovery hose assembly. As such, it allows the outer hose to be constructed from a light weight corrugated material, preferably a thermoplastic. The corrugated construction provides the greater flexibility and increased crush and kink resistance over what would be attainable with the use of a smooth wall construction. The outer hose material can be selected to be oil and solvent resistant as well as abrasion resistant to withstand the wear and tear during use. In addition to its increased durability, the resilience of the material can be maintained with a substantially reduced wall thickness thus contributing to the considerably lower weight of the assembly.

DETAILED DESCRIPTION OF THE DRAWINGS

Figure 1:
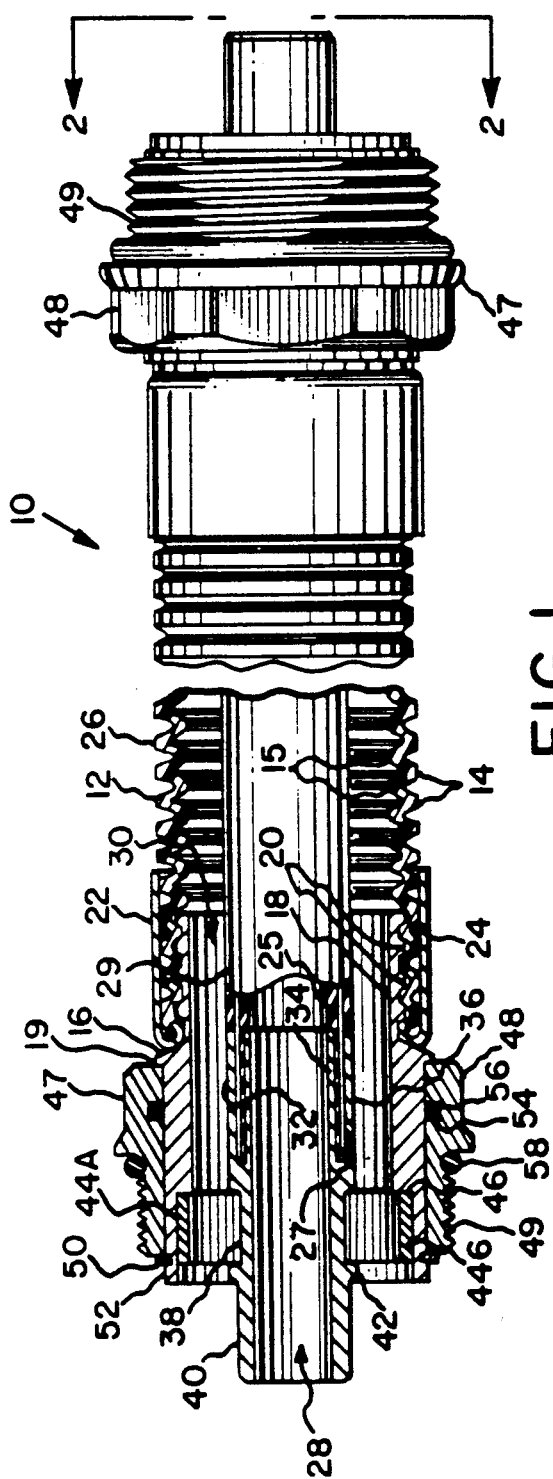
FIG. 1 is a side view, partially in cross section, of the coaxial vapor recovery hose assembly
Figure 1A:
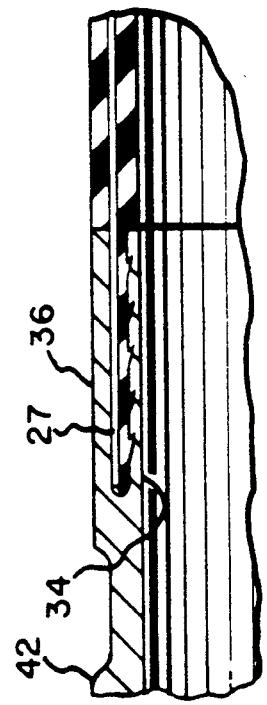
FIG. 1a is an enlarged portion in cross section of the inner hose coupling.

The coaxial vapor recovery hose assembly, designated generally by numeral 10 in FIG. 1, is comprised of an outer hose 12 having external corrugations 14 and internal corrugations 15 which define an inside diameter of outer hose 12 and an inner hose 26 of substantially incompressible construction disposed concentrically within the outer hose 12. The inner hose 26 defines an inner liquid passageway 28 and has an outside diameter smaller than the inside diameter of outer hose 12 to define an annular vapor passageway therebetween.

The assembly 10 has an outer coupling stem, designated generally by numeral 16, having a larger external diameter end portion 17 and a smaller external diameter end portion 18. The larger external diameter end portion 17 has a recessed portion 46 on its internal periphery at a point furthest away from smaller external diameter end portion 18, a raised shoulder 19 on its outer periphery at an intermediate point on stem 16 adjacent to smaller external diameter end portion 18 and a circumferentially extending groove 50 on the outer periphery at the same end as recessed portion 46.

The smaller external diameter end portion 18 has circumferential corrugations 20 on its outer periphery to correspond with the internal corrugations 15 when an end portion of outer hose 12 is fit over smaller external diameter end portion 18 of stem 16.

The outer hose 12 is fastened to the outer coupling stem 16 by internally expanding the smaller external diameter end portion 18 against outer hose 12 and in turn against an outer hose ferrule 22. An 0-ring 24 is located between one of the outer corrugations of outer hose 12 and ferrule 22 to provide a resilient fit between outer hose 12 and ferrule 22.

Inner hose 26 is disposed within outer hose 12 to provide the inner liquid passageway 28 and has an outside diameter smaller than the inside diameter of outer hose 12 to define the vapor passageway 30 for the return of the volatilized vapors from the volatile liquid receiving tank. The inner hose 26 is constructed from tube member 25, wire reinforcement 27, and a cover layer 29. Each end portion of inner hose 26 having a section of cover 29 removed is connected to inner coupling 32. Inner coupling 32 has an internally expanded stem portion 34 and an externally crimped ferrule portion 36 which when in the crimped position provides intimate contact with wire reinforcement 27 to provide a grounding means throughout the vapor recovery hose assembly. Inner coupling 32 also has a smaller outside diameter inner portion 38 and an intermediate outside diameter end portion 40 having therebetween a ridge 42 on the outer periphery of the inner coupling 32. The means for holding the hose in concentric relationship is shown generally by spider 44. Spider half portions 44a and 44b are disposed about the smaller outside diameter inner portion 38 between ridge 42 and the externally crimped ferrule portion 36 of inner coupling 32. Each spider half 44a and 44b has a V-shaped portion and two diametrically opposed leg portions extending from the spread ends of the V and of such a length as to be received in recess 46 on the internal periphery of the larger external diameter end portion 17 of outer coupling stem 16.

Disposed about the larger external diameter end portion 17 of outer coupling stem 16 is swivel nut 47 which has a hexagonal end portion 48 and a threaded end portion 49. Swivel nut 47 is retained on the outer coupling stem 16 by means of snap ring 52 which is fitted into a circumferentially extending groove 50 located on the outer periphery of the larger external diameter end 17 of the outer coupling stem 16. Swivel nut 47 also has an intermediate inner peripheral groove 54 which is fitted with O-ring 56 to provide a seal between the swivel nut 47 and the outer coupling stem 16. The sealing of swivel nut 47 is accomplished by O-ring 58 which is located about the outer periphery of swivel nut 47 intermediate between hexagonal portion 48 and thread portion 49.

As can be appreciated the spider halves 44a and 44b serve to maintain the essentially coaxial relationship between inner hose 26 and outer hose 12 to retain access to the vapor passageway 30 therebetween. They also serve to transmit the stress-bearing load from inner conduit 26 to swivel nut 47 when attached to either a discharge nozzle (not shown) or to a pump stand (also not shown).

Figure 3:
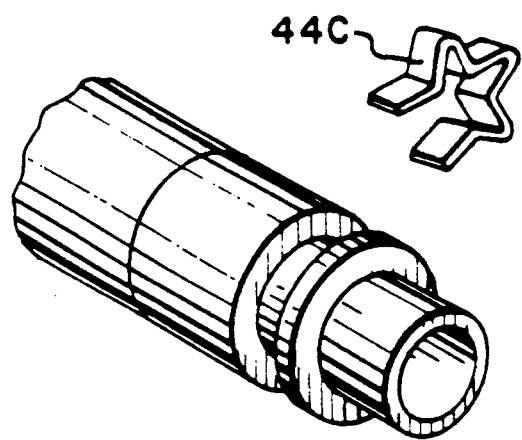
FIG. 3 is a perspective view of an alternative design of the means for holding the hoses of the assembly in concentric relationship.

An alternative design for spider 44 is illustrated in FIG. 3 as 44c. Spider 44c is a one-piece metal strip having a width equal to the axial length of the smaller outside diameter inner portion 38 of the inner coupling 32 and having been bent along its length to form a generally star-shaped configuration with its two end portions being essentially parallel and spaced apart to define an opening whereby the spider 44c can be placed into the groove defined by said smaller outside diameter inner portion 38 between ridge 42 and ferrule portion 36 of the inner coupling 32. The inner apices of the star-shaped spider define an inner diameter equal to said smaller outer diameter and the outer apices along with the two ends of the strip define an outer diameter which is equal to the inner diameter of the recessed portion 46 on the internal periphery of the outer coupling stem 16.

Figure 4:
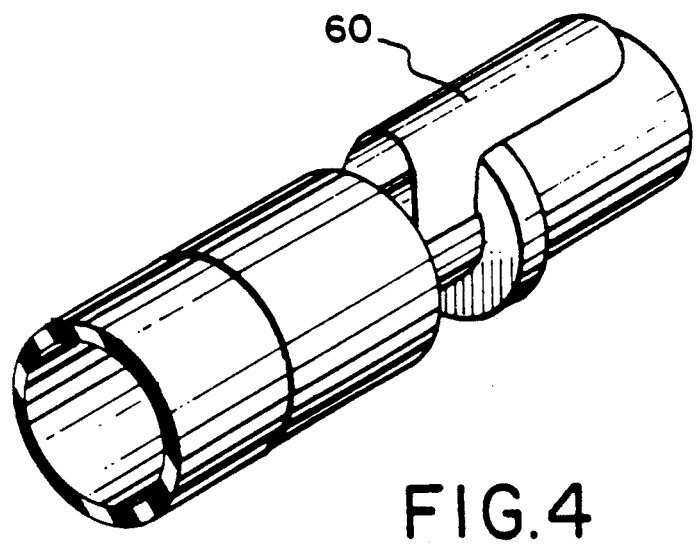
FIG. 4 is a perspective view of a rotational detent which optionally may be used in the present invention.

It may be desirable or even necessary at times to maintain the inner conduit in relative juxtaposition to a pumpstand in order to employ such devices as aspiration tubes which are sometimes inserted in the annular vapor passage for removing condensed vapors which would tend to reduce or block vapor flow. Such a tube is disclosed in U.S. Pat. No 4,566,504. In order to accomplish this, one embodiment of the present invention provides a rotational detent 60 as illustrated in FIG. 4 which can be press fit into the smaller outside diameter inner portion 38 of inner coupling 32 between ridge 42 and the externally crimped ferrule portion 36. The detent 60 is formed by bending a "T" shaped piece of metal having a body portion having opposite side portions and a cross bar portion having opposite end portions along an axis coinciding with the centerline of the body portion such that the opposite end portions of the cross bar and the opposite sides of the body portion form a generally U-shaped article having longer leg portions resulting from the cross bar end portions being brought parallel to each other and shorter leg portions resulting from the opposite side portions of the body being brought parallel to each other. The longer leg portions have axial lengths which are sized slightly longer than the axial length of the smaller outside diameter inner portion 38 in order to provide a tight fit between the ridge 42 and ferrule portion 36 while the shorter leg portions extend over the ridge 42 toward the direction of the end of the inner coupling 32 which engages a mating coaxial coupling on the pumpstand. The coupling on the pumpstand must be equipped with means for receiving the shorter leg portion to prevent rotation of the inner coupling with the detent attached thereto within it.

The outer hose 16 can be made from any one of a number of thermoplastics, thermoplastic elastomers or thermosetting elastomers which exhibit the properties of toughness, abrasion resistance, resistance to oils and gasoline and retain flexibility down to minus 45° C. Representative of these materials are polyester-based polyurethanes, polyether-based polyurethanes, polyamides, thermoplastic copolyesters thermoplastic elastomers, thermosetting polyurethanes, chlorinated polyethylenes, epichlorohydrin and blends of copolymers of butadiene and acrylonitrile with polyvinylchloride.

The thermoplastic and thermoplastic elastomer hoses can be formed into corrugations by means of equipment such as is described and illustrated in U.S. Pat. No. 4,165,214. The process usually involves the extrusion and blow molding of the thermoplastic materials into corrugated mold pieces. The alternating peaks and valleys of the corrugations may be molded in various shapes such as round or square or triangular or any combination thereof It is preferred that the outer peaks be square and the inner valleys be round to provide for minimum resistance to pulling while maintaining sufficient surface area to improve abrasion resistance. It is also preferred that the thermoplastic be a polyester-based polyurethane. It is also preferred that the thermoplastic material have a hardness range on the Shore D scale of 40 to about 80, preferably 50 to about 60.

The thermosetting elastomers can be formed into corrugated outer hoses by any conventional means known in the art followed by curing, also by conventional means such as in an oven or autoclave, molten salt bath and the like.

While it can be appreciated that an outer hose having only external corrugations can be used in the present invention, it is preferred that the hose have both external and internal corrugations to provide for a greater degree of both compressibility and expandability in the axial direction and thus preclude possible premature fatigue failure were a hose with a smooth inner surface to be used. It is also desirable that the outer hose/coupling assembly be able to withstand a longitudinal pull strength of at least 100 pounds force without separation. This can be tested by suspending a hose/coupling assembly by one of its couplings, attaching a 100 pound weight to the other coupling and raising the entire assembly This test measures the integrity of the attachment of the coupling to the hose.

The inner hose 26 having a tube, outer cover and wire reinforcement should be sufficiently incompressible to resist being crushed if the assembly should be run over by a vehicle wheel. The inner hose tube and cover materials can be made of any suitable rubber compound which is compatible with the volatile fluid being conveyed such as for example, polychloroprene and copolymers of acrylonitrile and butadiene. While there is no industry standard for longitudinal pull strength, it is desirable that the inner hose/coupling assembly of the present invention, being the stress bearing member, have a pull strength of at least 500 pounds force. The materials used to make the components of the couplings are preferably metallic such as zinc, steel or brass. Further, the O-rings 22, 56 and 58 can be made of any material which is resistant to the fluid to be handled such as polychloroprene, fluorelastomers and polymers of acrylonitrile and butadiene.

In operation, one end of the coaxial vapor recovery hose assembly is connected to a volatile liquid pump stand and the other end of the assembly is connected to a delivery nozzle for insertion into the receiving tank. The volatile liquid is pumped through the inner hose 26 from the pump stand through the nozzle into the receiving tank and the volatile vapors are displaced by the liquid to return through the nozzle through the annular passageway between inner hose 26 and outer hose 12 back to the pump stand and into the supply tank. Various vapor recovery nozzle designs are well known in the art and since not a part of the present invention, will not be further described.

The benefit of using a corrugated thermoplastic outer hose in a coaxial vapor recovery assembly is to provide an assembly with reduced weight and greater flexibility to provide easier handling and greater maneuverability. It is believed that the improved kink and crush resistance will provide a longer serviceable life for the assembly. In addition, the simplified design allows for easy changing of either the inner hose or the outer hose without special tools other than those required to disconnect the coupling from either the nozzle or the pump.

EXAMPLE

A coaxial vapor recovery hose assembly of the present invention was made as follows:

An inner hose comprised of a tube of an acrylonitrile/butadiene copolymer based composition was extruded to have an inside diameter of approximately 0.5 inches, a steel wire braid over the tube and an acrylonitrile/butadiene copolymer/PVC blend based cover extruded to an outside diameter of 0.08 inches was fitted with one-piece couplings on each end of a 10 ft length. The cover was skived at each end of the hose to expose the wire braid to the ferrule portion of the coupling. The couplings made of chrome-plated annealed brass each having an intermediate outside diameter end portion of 0.66 inches, a smaller outside diameter inner portion of 0.625 inches and an outside diameter of the ridge portion of 0.80 inches, conforming to inner coupling 32 of FIG. 1, were internally expanded and externally crimped onto the skived end portions of the inner hose. The hose/coupling assembly was tested for pull strength which was 500 pounds or greater.

An outer hose of a thermoplastic polyurethane which had been extruded and blow molded to have square peaks on the outer periphery and round valleys on the inner periphery having a wall thickness ranging from 0.030 to 0.090 inches, depending on whether the measurement was taken as being at a peak or at a valley, and having a length of 9 feet, 10 inches was fitted at each end over an outer coupling 16 conforming to FIG. 1 after having O-rings made of an acrylonitrile/butadiene based composition placed between adjacent outer corrugations and located so as to contact outer ferrules corresponding to reference numeral 22 of FIG. 1. The smaller external diameter end portions 18 having circumferential external corrugations 20 were internally expanded to seal the outer hose and the O-rings to the outer ferrule. The outer couplings were of chrome-plated annealed steel construction about which were placed zinc swivel nuts each having a fluoroelastomeric O-ring in an intermediate inner peripheral groove and an acrylonitrile/butadiene copolymer based O-ring located on the outer periphery at the junction of the threaded portion and the hexagonal end portion. The swivel nuts were held in place by snap rings on one end and shoulders on the external periphery of the couplings on the other end.

Figure 2:
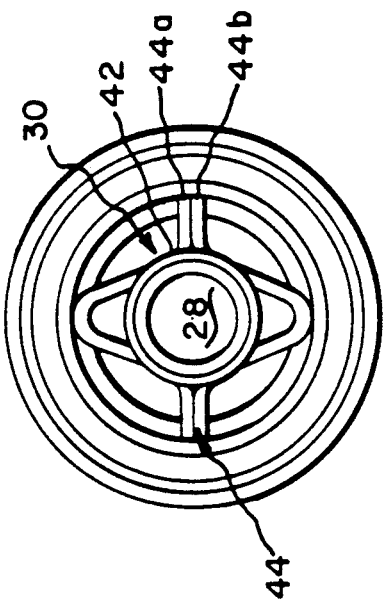
FIG. 2 is an end view shown along line 2—2 of FIG. 1.

The inner hose was then placed within the outer hose and pairs of spider halves corresponding to reference numerals 44a and 44b of FIG. 2 were placed over the smaller outside diameter inner portions of the inner coupling. The inner couplings with the spiders in place were then inserted into the recessed portions of the outer couplings.

The 10 foot assembly of the present invention as just described had a weight of approximately 4.5 pounds while a 10 foot length of a commercially available coaxial vapor recovery hose assembly including its fittings weighed approximately 10 pounds.

While certain representative embodiments and details have been shown for the purpose of illustrating the invention, it will be apparent to those skilled in the art that various changes and modifications may be made therein without departing from the spirit or scope of the invention.

What is claimed is:

1. A coaxial vapor recovery hose assembly for dispensing volatile fuels wherein one hose carries fuel from a supply tank to a receiving tank and another hose carries fuel vapors from the receiving tank back to the supply tank comprising:
   (a) an inner hose,
   (b) an outer hose, and
   (c) means for holding said hoses in concentric relationship;
   wherein said inner hose is substantially reinforced with metallic wire to be relatively incompressible as well as to be capable of bearing tensile stress applied to the assembly, having an outside diameter and an inside diameter to define an inner hose wall thickness;
   wherein said outer hose is lightweight, crust and kink resistant and is circumferentially corrugated, is selected from the group consisting of thermoplastics, thermoplastic elastomers, polyamides, thermoplastic polyurethanes and thermoplastic copolyesters and has an inside diameter larger than the outside diameter of the inner hose to define a vapor passageway therebetween and an outside diameter to define an outer hose wall thickness, and wherein the ratio of the inner hose wall thickness to the outer hose wall thickness is 1.67:1 to 5.0:1.

2. The assembly of claim 1 wherein said outer hose is corrugated to have square outer peaks and round inner valleys.

3. The assembly of claim 1 wherein said holding means is in the form of a pair of spider half portions each having a V-shaped portion and two diametrically opposed leg portions extending from the spread ends of the V-shaped portion.

4. The assembly of claim 1 wherein the inner hose is capable of bearing a pull strength of 500 pounds (227 kg).

5. In combination with a gasoline curb pump and a fuel dispensing nozzle, a coaxial vapor recovery hose assembly according to claim 1 connected therebetween.

* * * * *

UNITED STATES PATENT AND TRADEMARK OFFICE
CERTIFICATE OF CORRECTION

PATENT NO. : 5,005,613
DATED : April 9, 1991
INVENTOR(S) : John H. Stanley

It is certified that error appears in the above-identified patent and that said Letters Patent is hereby corrected as shown below:

Column 5, line 56, delete "0.08" and insert --0.80--;
Column 6, line 60, delete "crust" and insert --crush--.

Signed and Sealed this

Thirteenth Day of October, 1992

Attest:

DOUGLAS B. COMER

*Attesting Officer*　　　　Acting Commissioner of Patents and Trademarks